United States Patent [19]

Adamaitis

[11] 3,920,207
[45] Nov. 18, 1975

[54] FLAG POLE HOLDER

[76] Inventor: Richard C. Adamaitis, 4608 Drendell Road, Downers Grove, Ill. 60515

[22] Filed: Aug. 29, 1974

[21] Appl. No.: 501,709

[52] U.S. Cl. .................................. 248/42; 224/5 E
[51] Int. Cl.² ........................................ A01K 97/10
[58] Field of Search .......... 248/38, 40, 42; 224/5 R, 224/5 E

[56] References Cited
UNITED STATES PATENTS

| | | | |
|---|---|---|---|
| 120,381 | 10/1871 | Heberling | 248/42 |
| 1,761,497 | 6/1930 | Smith | 248/38 X |
| 2,576,624 | 11/1951 | Miller | 248/42 |
| 2,598,021 | 5/1952 | Schwanke | 248/38 X |
| 2,658,650 | 11/1953 | Jasper | 224/5 E |
| 2,719,659 | 10/1955 | Bowman | 224/5 E |
| 2,781,958 | 2/1957 | Lewandowski | 224/5 E |
| 2,954,909 | 10/1960 | Miller et al. | 224/5 E |

*Primary Examiner*—Roy D. Frazier
*Assistant Examiner*—Terrell P. Lewis

[57] ABSTRACT

A flag pole holder intended to be detachably secured to a tree trunk, telephone pole, and the like by means of flexible straps and including a base plate having a socket projecting upwardly from the front thereof at an angle thereto adapted to receive a flag pole mast therein for flag display purposes.

1 Claim, 3 Drawing Figures

U.S. Patent  Nov. 18, 1975  3,920,207
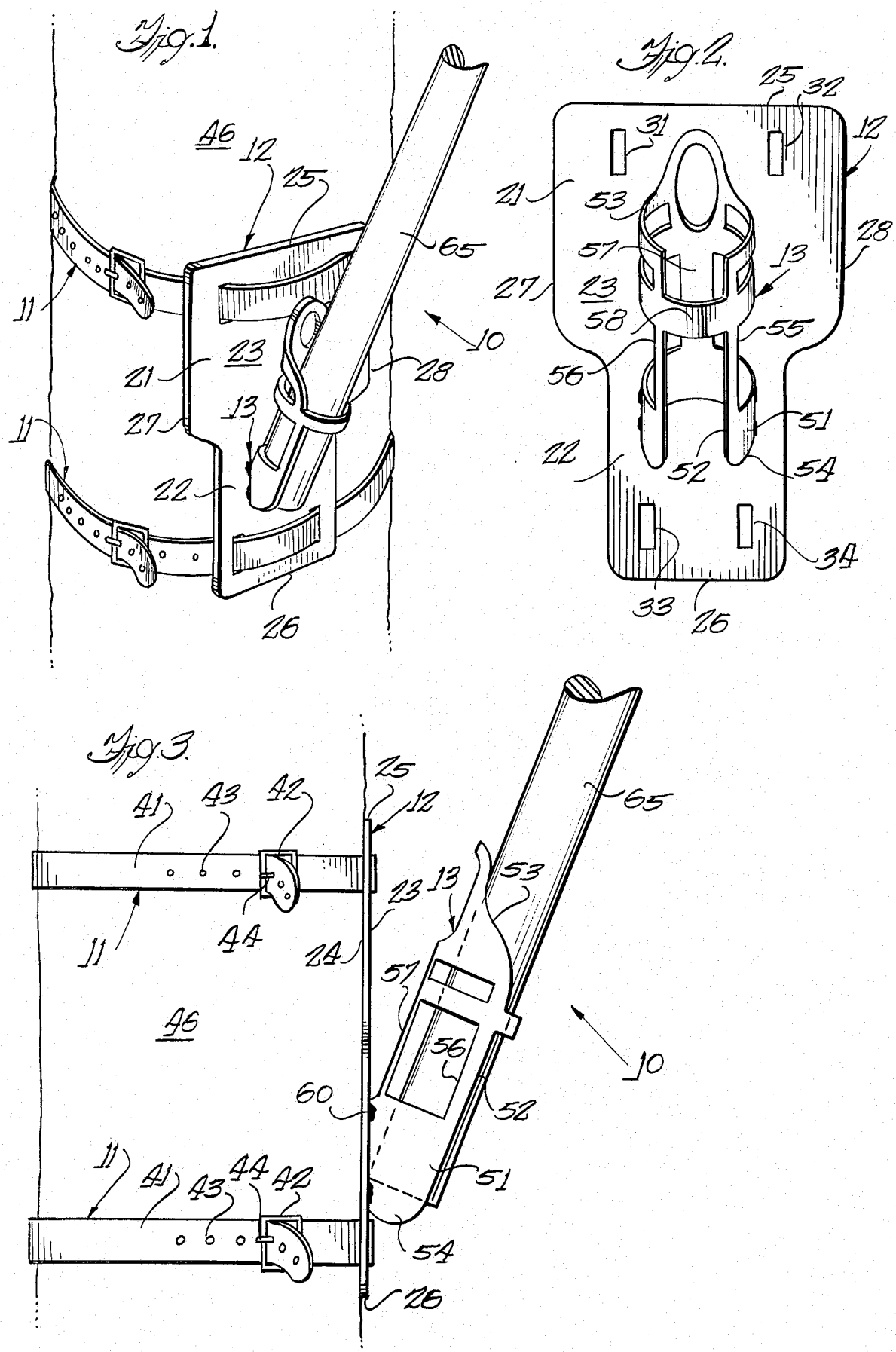

FLAG POLE HOLDER

BACKGROUND OF THE INVENTION

1. Field of the Invention

This invention relates generally to flag accessories and more particularly to a novel and improved flag pole holder intended to be detachably mounted to a tree trunk, telephone pole, and the like in a manner not injuring the same and to provide a socket for the support of a flag mast therein.

2. Description of the Prior Art

During festive times of the year or on holidays and the like it is frequently desirable to display flags or pennants along a parade route, a picnic area, and the like with such being supported from trees, telephone poles, and the like.

The prior art discloses such flag supporting devices, however, they are of the type requiring slight damage to the tree trunk or telephone pole to retain the flag support in position thereon, this not being desirable to either the tree or the telephone pole such that a device for detachably mounting flags from tree trunks, telephone poles, and the like in a manner requiring no damage whatsoever to the same would be highly desirable.

SUMMARY OF THE INVENTION

The present invention provides a novel flag pole holder which is adapted to be detachably mounted to a tree trunk, telephone pole, and the like requiring no permanent attachment thereto or any damage thereto and including means thereon for detachably receiving the mast end of a flag pole for displaying the same therefrom.

It is a feature of the present invention to provide a novel flag pole holder.

A further feature of the present invention provides a flag pole holder which is relatively simple in its construction and which therefore may be readily manufactured at a relatively low cost and by simple manufacturing methods utilizing readily available materials such that it can be retailed at a sufficiently low price to encourage widespread use and acceptance thereof.

Still a further feature of the present invention provides a flag pole holder which is devoid of moving parts and which therefore is unlikely to get out of order.

Yet still a further feature of the present invention provides a flag pole holder which is easy to use and reliable and efficient in operation.

Still yet a further feature of the present invention provides a flag pole holder which is aesthetically pleasing and refined in appearance.

Yet still a further feature of the present invention provides a flag pole holder which is of a rugged and durable construction and which therefore may be guaranteed by the manufacturer to withstand many years of intended usage.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a front perspective view of the flag pole holder detachably mounted to a tree trunk;

FIG. 2 is a front elevational view of the flag pole holder; and

FIG. 3 is a side elevational view of the flag pole holder mounted to the tree trunk.

DESCRIPTION OF THE PREFERRED EMBODIMENT

Referring now to the drawings in detail there is illustrated a preferred form of a flag pole holder constructed in accordance with the principles of the present invention and which is designated generally in its entirety by the reference numeral 10 and which is comprised of three component parts, namely a pair of flexible supporting belts 11, a flat rigid metal base plate 12, and a mast holding socket 13 welded at one end to the base plate and projecting at an angle relative thereto.

The base plate 12 is of a flat rigid configuration manufactured of metal and having a top portion 21 of a rectangular configuration which is contiguously formed with a bottom portion 22 of a rectangular configuration, the base plate having a face surface 23, a back surface 24, a top edge 25, a bottom edge 26, and opposed side edges 27 and 28. The upper portion 21 is provided with a pair of transversely spaced apart vertically extending slots 31 and 32 adjacent top edge 25 with the bottom portion 22 being provided with a pair of similarly sized transversely spaced apart vertically extending slots 33 and 34 adjacent bottom edge 26.

The belts 11 are each of an identical configuration and each consist of an elongated rectangularly shaped flat flexible band 41 having a buckle 42 secured to one end thereof and provided with an aligned series of openings 43 extending longitudinally through the opposite end thereof, the openings adapted to be brought into selective registration with buckle tongue 44 to secure the belt in a closed loop manner.

As seen in FIGS. 1 and 3, the belts 11 pass through associated sets of openings 31, 32 and 33, 34 and from there extend circumferally about telephone pole or tree trunk 46 to retain the base plate 12 secured tangentially to the tree trunk with the base plate back surface 24 in engagement therewith and extending longitudinally therealong.

The socket 13 consists of a general sleeve like body member 51 having a slot 52 extending longitudinally through the side walls intermediate the top end 53 and bottom end 54 of the body member. Disposed in diametrically spaced apart positions of the body member 51 are rectangular openings 55 and 56 extending parallel to slot 52 with the side edges thereof furthest from the slot defining therebetween a vertical supporting member 57 extending parallel to the slot and interconnecting the bottom and top ends 54 and 53 respectively. A cylindrical ring-shaped member 58 extends outwardly from opposite side edges of the support member 57 within the bounds of openings 55 and 56 and extends through such openings and across the slot 52 in a manner forming a brace therefor. The bottom portion of support 57 merges with bottom end 54 and is tapered relative thereto in a manner to define a flat surface 60 which is welded to the front surface 23 of base plate 12 on the lower portion 22 thereof and centrally thereof such that the socket 13 extends at an angle outwardly and upwardly from the base plate bottom portion to overlie the base plate top portion.

The pole or mast 65 of a flag is then easily inserted into the socket 13 to be removably supported therein.

There is thus provided a novel flag pole holder readily detachably mounted to a tree trunk, telephone pole, and the like in a manner requiring no damage thereto and providing a socket for the proper support of the mast or pole of a pennant or flag pole or the like.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

I claim:

1. A flagpole holder intended to be removably mounted to tree trunks, telephone poles, and the like, comprising:

a rigid base plate comprising a flat plate formed of metal and having a top portion of a general rectangular configuration formed along one edge contiguous with a lower portion of a smaller sized generally rectangular configuration, the base plate having a flat front surface, a flat back surface, a top edge, a bottom edge, and opposed side edges, the base plate further comprising a pair of identical transversely spaced apart vertically extending openings disposed in the top portion adjacent the top edge and a pair of substantially identical transversely spaced apart vertically extending openings disposed in the bottom portion adjacent the bottom edge thereof;

a pair of flexible strap retaining members operatively associated with the base plate and adapted to secure the base plate to a side of the supporting tree trunk, the straps being defined by a pair of separate identical flat rectangularly elongated flexible bands each having a buckle affixed to one end thereof and each provided with a plurality of latitudinally aligned spaced apart apertures in the opposite end thereof, each strap intended to be passed through a pair of associated openings in the base plate and to circle the supporting tree trunk with a selected one of the apertures brought into registration with the buckle to be secured thereby to removably retain the base plate mounted to the tree trunk with the back surface of the base plate in engagement with the tree trunk; and a sleeve forming socket member affixed to the base plate and projecting upwardly and outwardly therefrom and adapted to removably receive therein the terminal end of a flagpole or mast to removably support the same therein for display purposes, the sleeve forming socket member being defined by a hollow open-ended sleeve body member having side walls, a back portion, a bottom end and a top end, a slot extending completely through the side walls between the top and the bottom end thereof, the bottom end of the sleeve body member diametrically opposed from the slot being flattened to provide a mounting surface disposed in juxtaposition with the base plate front surface on the bottom portion thereof and being welded thereto such that the sleeve body member projects upwardly and outwardly from the base plate at an angle thereto such that the top end of the sleeve forming socket member overlies a top central portion of the top portion of the base plate, a pair of identical diametrically opposed rectangularly shaped openings disposed through each of the side walls intermediate the slot and the back portion of the sleeve body member and extending between the top and bottom ends of the sleeve body member, and a cylindrical shaped ring member disposed normal to the axis of the sleeve body member and extending from the back portion completely through the rectangularly shaped openings and across the slot to define a supporting bracket for removably engaging a portion of the flagpole mast inserted thereinto.

* * * * *